United States Patent [19]

Riley

[11] 4,411,787

[45] Oct. 25, 1983

[54] REVERSE OSMOSIS APPARATUS

[75] Inventor: Robert L. Riley, San Diego, Calif.

[73] Assignee: UOP Inc., Des Plaines, Ill.

[21] Appl. No.: 400,786

[22] Filed: Jul. 22, 1982

[51] Int. Cl.³ ............................................. B01D 31/00
[52] U.S. Cl. ................................. 210/321.5; 210/433.2
[58] Field of Search ............... 210/321.1, 321.3, 433.2, 210/494, 321.5

[56] References Cited

U.S. PATENT DOCUMENTS 3,228,876  1/1966  Mahon ........................... 210/321.3 X
3,813,334  5/1974  Bray .................................... 210/321.1

Primary Examiner—Frank A. Spear, Jr.

[57] ABSTRACT

A reverse osmosis module in which the semipermeable membrane comprising a microporous support reinforced on one side thereof with a backing material and the other side thereof having deposited thereon an ultrathin film formed by cross-linking polyethyleneimine with a cross-linking agent such as isophthaloyl chloride and the backing for the membrane sandwich comprising a film of a polyethylene-terephthalate positioned between two layers of an epoxy-impregnated polyester may be utilized to concentrate or dewater aqueous solutions at elevated temperatures and pressures. The module may be used at temperatures ranging from about 50° to about 95° C. and pressures ranging from 400 to about 1200 psi to dewater aqueous sugar solutions, salt solutions, starch solutions, etc.

5 Claims, No Drawings

REVERSE OSMOSIS APPARATUS

BACKGROUND OF THE INVENTION

Heretofore, various forms of apparatus have been used in a reverse osmosis separation process. Osmosis is a diffusion proceeding in which the diffusion proceeds through a semipermeable membrane, typically separating two solutions of unequal concentration, the osmosis tending to equalize the concentration of the solutes in each solution. The semipermeable membrane possesses a finite permeability for one component of a solution, for example, water, while remaining totally impermeable to another component in the solution such as, for example, sodium chloride. During the process of osmosis, pure water diffuses from a first solution having a lower solute concentration through the membrane into a second solution having a higher solute concentration.

It is possible to restrain diffusion of the pure water through the membrane by maintaining the second solution, which possesses the higher solute concentration, at an elevated pressure with respect to the pressure conditions of the first solution. The particular pressure at which diffusion through a semipermeable membrane into the second solution is substantially retarded or halted is known as the osmotic pressure. However, if the pressure applied to the second solution is further increased relative to that applied to the first solution such that osmotic pressure of the second solution is exceeded, reverse osmosis occurs. The particular pressure which is required to bring about reverse osmosis is generally dependent upon the composition of the particular solutions disposed on opposite sides of the semipermeable membrane. A particularly applicable operation of reverse osmosis is in the gas of sea water. For example, if a sea water is disposed on one side of an appropriate semipermeable membrane and a relatively pure water solution, or a gaseous atmosphere is present on the other side, reverse osmosis begins to occur when the sea water is subjected to a pressure of approximately 350 psi absolute. As a result of this reverse osmosis, pure water diffuses through the membrane from the sea water.

Certain types of apparatus which may be utilized for reverse osmosis applications such as desalinization of sea water, are known from such patents as U.S. Pat. Nos. 3,367,504, 3,386,583 and 3,417,870, among others. However, these patents utilize, as a backing material for semipermeable membranes which form a product water passageway, such materials as cotton, wool, graphite, cloth, silicon carbide grit or salt particles held together with a suitable binder, glass felt, or fibrous plastic material such as nylon, polyester, rayon, rayon viscose, acrylic fibers, etc.

As will hereinafter be shown in greater detail, a reverse osmosis apparatus has been prepared which will permit the use of such an element in a high temperature operation at relatively high applied pressures. The operability of this element is due to the use of certain composites which provide a novel arrangement of materials to form the product water-carrying channels.

BRIEF SUMMARY OF THE INVENTION

This invention relates to an improvement in an apparatus for purifying or concentrating a desired product into a process employing the apparatus. More specifically, the invention is concerned with an improved reverse osmosis apparatus and to a process utilizing this apparatus whereby the aforesaid process may be effected at relatively high temperatures and applied pressures.

It has now been discovered that certain processes involving the concentration or dewatering of aqueous solutions containing a solute therein is advantageously effected at relatively high temperatures. By employing high temperatures in dewatering operations such as the dewatering of aqueous solutions containing sugar, it is possible to retard or substantially halt the growth of any bacteria which may be present in the aqueous solution. In addition, by dewatering the sugar solution at a relatively high temperature within the range hereinafter set forth in greater detail, it is also possible, upon recovery of the concentrated or dewatered solution, to allow the sugar to crystallize out and be recovered upon the solution reaching room temperature. In addition to utilizing the process and apparatus of the present invention to dewater sugar, it is also contemplated that aqueous solutions containing other solutes such as salt, organic or inorganic chemicals, dairy products, maple syrup, starches, etc. may also be concentrated or dewatered utilizing the process and apparatus thereof.

It is therefore an object of this invention to provide an improved reverse osmosis apparatus utilizing certain composite materials as a backing for the semipermeable membranes contained therein.

A further object of this invention is found in an improved process and apparatus for concentrating or dewatering an aqueous solution containing a solute dissolved therein by operating the process at an elevated temperature and pressure.

In one aspect, an embodiment of this invention resides in an apparatus for recovery by reverse osmosis of a desired product from an aqueous solution comprising a hollow mandrel having axial passageway means provided therein, a layer of first porous backing material adjacent to and surrounding said mandrel, a plurality of generally laterally coextensive leaves of porous backing material in contact with and extending generally radially outward from said first backing material, said leaves having at least one edge thereof in a generally parallel relationship to the longitudinal axis of said mandrel, a plurality of semipermeable membrane sheets, each having a fold line therein, said fold line being positioned in contact with said first porous backing material in a generally parallel relationship to the longitudinal axis of said mandrel, and each positioned between two of said leaves of porous backing material, a plurality of separator grid sheets each positioned within the folds of said membranes to form a fluid conducting passageway within each of said folds, said pluralities of porous backing material, membranes and separator grids being spirally wound around said first backing material in overlapping relationship upon one another to form a roll comprising multiple layers of porous backing material-membrane-fluid conducting passageway-membrane groupings, means to supply said fluid to one end of said fluid conducting passageway, means to withdraw fluid from the opposite end of said passageway, and means to withdraw fluid from said hollow mandrel, the improvement comprising utilizing as a backing material for said semipermeable membranes a composite consisting of a film of a polyethylene terephthalate positioned between two layers of an epoxy-impregnated polyester, said composite forming a product-water carrying channel.

Another embodiment of this invention resides in a method for concentrating an aqueous solution containing dissolved solute therein which comprises passing said solution through the apparatus of claim 1 at concentration conditions, and recovering the resultant concentrated solution.

A specific embodiment of this invention is found in an apparatus for recovery by reverse osmosis of the desired product from an aqueous solution in which the backing material comprising a composite consisting of a polyethylene terephthalate positioned between two layers of an epoxy-impregnated polyester has been treated at a temperature in the range of from about 100° to about 150° C. in an air atmosphere prior to use thereof.

Another specific embodiment of this invention is found in a method for concentrating an aqueous solution containing sugar in which said solution is passed through the improved apparatus of the present invention at a pressure in the range of from about 400 to about 1200 psi and a temperature in the range of from about 50° to about 95° C., and recovering the resultant concentrated solution.

Other objects and embodiments will be found in the following further detailed description of the invention.

DETAILED DESCRIPTION OF THE INVENTION

As hereinbefore set forth, the present invention is concerned with an improved reverse osmosis apparatus and to a process for effecting the concentration or dewatering of aqueous solutions at relatively high temperatures. The apparatus of the present invention is similar in nature to that described in U.S. Pat. No. 3,417,870 and comprises a multi-leaf membrane module, a pressure-tight enclosure for containing the module, and a product water take-off assembly. The module will include a central hollow mandrel which also serves as the product water collection means or take-off tube. A plurality of membrane sandwiches are interleafed between a corresponding number of strips of backing material of the type hereinafter set forth in greater detail which will enable the apparatus to be used at the relatively high operating temperatures of the present process, said backing material being bonded to the mandrel. The membrane sandwiches comprise a sheet of semipermeable membrane material of the type hereinafter set forth in greater detail folded back upon itself and a strip of separator grid material which is disposed intermediate each of the respective folds. The membrane sandwiches are disposed about the mandrel in an equally spaced relationship with each other to spirally wind the sandwich and the backing material tightly about the mandrel. In fabricating the membrane module, one end of the sheet of backing material comprising a composite of a type suitable for use as a product water-carrying channel is initially tightly wound about substantially the entire circumferential surface of the mandrel, the opposite end of the sheet extending radially from the mandrel for a predetermined distance. The membrane sandwich which, as hereinbefore set forth, comprises the folded sheet of membrane material and the strip of separator grid material is disposed adjacent the radially extending portion of the sheet of backing material such that its closed end, the fold line of the sheet of membrane material, is in contact with a portion of the backing material which is wound around the mandrel and its fold is adjacent the radially extending portion of the backing material. The mandrel is preferably rotated a predetermined angular distance so that the fold of the sandwich contacts the backing sheet. A fluid-tight seal is provided along the outer edges of the area of contact between the fold of the sandwich and the radially extending portion of the backing material by use of a suitable adhesive at these regions. This enables the backing material to be sealed from communication from solution which has not initially passed through the membrane material and, in addition, also serves to provide a passageway through the backing material for the product water.

One end of the sheet of backing material of one membrane sandwich is disposed on contact with a portion of the backing material of an adjacent membrane sandwich wound about the surface of the mandrel, the other end of the sheet of the first backing material extending radially outward therefrom. A sheet of the backing material is then placed in contact with a fold of the membrane sandwich, thus providing a fluid-tight seal between the backing material and the fold which is similar to that provided between the fold and backing material of the adjacent membrane sandwich and sealed. The action is repeated with the various membrane sandwiches in order to suitably bond a desired number of sandwich leaves, and wound about the mandrel to form a roll. After completing the bonding of the sandwich leaves and winding the same in a leafed configuration which is wound around the mandrel, a layer of bonding material is applied along the outer edges of each of the strips of the backing material to define the product water channel or passageway within the product water backing material, and precludes communication of the backing material with the solution which is not passed through the membranes and which is introduced into the area adjacent to the edges of the wrapped module.

The backing material which is utilized in the apparatus to allow a reverse osmosis process employing relatively high temperatures and applied pressures comprises a composite which consists of a dense film of a polyethylene terephthalate positioned between two layers of an epoxy-impregnated polyester. In the preferred embodiment of the invention, the epoxy-impregnated polyester comprises a product known generally as tricot. The tricot possesses a smooth, dense surface on one face thereof, while the other surface thereof contains channels or grooves. The backing material for the apparatus of the present invention consists of the two layers of the aforementioned tricot material separated by a thin film of polyethylene terephthalate, the thickness of said polyethylene terephthalate being in a range of from about 1 to about 10 mils. The upper channels of the tricot are placed next to the film, while the smooth, dense surfaces of the epoxy-impregnated tricot polyester contact the semipermeable membrane. It has now been discovered that by treating the backing material comprising the composite of polyethylene terephthalate positioned between two layers of epoxy-impregnated polyester at a relative temperature in the range of from about 100° to about 150° C. in an air atmosphere for a period of time ranging from about 0.5 to about 4 hours or more prior to incorporation into the module, it is possible to provide a product water channel in which the flow resistance in the channel at higher temperature and pressure is minimized. It is necessary to use this composite for the backing material which acts as a product water-carrying channel in the form thus described inasmuch as if only one layer of the epoxy-impregnated polyester were used, intrusion of the membrane by the polyester would occur and thus a less efficient transport of product water would occur. The particular configuration of the backing material acts to support each membrane and thus results in a more efficient water transport at elevated temperatures and pressures.

The semipermeable membrane material which is utilized in the module of the present invention comprises a microporous support reinforced on one side thereof by a backing and containing on the other surface thereof, a thin film. The microporous substrate may be selected from various commercially available materials such as Millipore filters or the microporous support may be cast from homopolymers or mixed polymers of cellulose acetate, cellulose nitrate, cellulose butyrate, polysulfone, polystyrene, etc. The microporous support as hereinbefore set forth will be reinforced by the addition of a backing such as a fabric which may be naturally occurring or synthetic in origin such as cotton, wool, linen, dacron, nylon, orlon, rayon, etc. The thin film which is in contact with the other side of the microporous support comprises, in the preferred embodiment of the invention, a polymer formed by the cross-linking of polyethyleneimine with a cross-linking agent such as acid chlorides including formyl chloride, acetyl chloride, propionyl chloride, butryl chloride, susinyl chloride, isophthaloyl chloride, ethylenediisocyanate, benzenediisocyanate, toluenediisocyanate, etc.

The semipermeable membrane may be formed by forming a wet continuous film on the surface of the microporous support by soaking the support in a solution of the polyethyleneimine following which the support is recovered, dried, and thereafter contacted with a solution of the cross-linking agent. After contacting the coated support with the cross-linking agent to effect a cross-linking and formation of an ultra-thin film, the composite semipermeable membrane may then be dried in air and drawn through means at an elevated temperature to further effect the drying, said means including radiant gas heaters, infra-red lamps, etc.

The mandrel which serves as a product water collection means is generally in the form of a hollow tubular member which may be provided with a plurality of slots or apertures on the outer circumference thereof. The slots or apertures must be within the region encompassed by the adhesive which binds the composite backing material to the mandrel. In the preferred embodiment, the mandrel comprises a relatively corrosion-resistant material, inasmuch as it is generally disposed in a relatively moist environment. As was hereinbefore set forth, one end of the backing material is wound about substantially the entire outer circumference of the mandrel while the other sheets of backing material are disposed in contact with the initial winding. By placing the composite backing material in such a position, a fluid communication is established between the slots or apertures in the mandrel and the product water carried by the composite backing material. This provision therefore permits the product water to flow into the hollow interior or the mandrel from which it may be removed.

The pressure-tight enclosure in which the module is positioned consists of a corrosion-resistant material such as copper, stainless steel, mold steel, fiberglass-reinforced epoxy, etc. and usually comprises a cylindrical outer shell having a cap secured to the upper end and a flange secured to the lower end, the cap and flange being secured to the shell by conventional means such as brazing, welding, etc. In addition, the enclosure is provided with a feed inlet pipe and outlet pipe. In the preferred embodiment, the internal diameter of the enclosure approximates the outer diameter of the module to provide a sufficiently tight fit between the module and the enclosure, thus obviating the need for further seals.

The process for dewatering or concentrating an aqueous solution containing a solute such as sugar, starch, salt, etc. is effected at elevated temperatures and pressures. The ability to effect the dewatering of the solution at elevated temperatures is due, as hereinbefore set forth, to the employment of the composite backing material of the type hereinbefore set forth in greater detail. Operating conditions which are employed for the dewatering of the solution include a temperature in the range of from 50° to about 95° C. and a pressure in the range of from about 400 to about 1200 psi absolute. In addition to these operating conditions, the concentration of the solute in the solution may range up to about 30% by weight of the solution. The process is effected by charging the aqueous solution to the unit at the aforesaid pressure sufficient to cause reverse osmosis, that is, to cause diffusion of product water from the aqueous solution through the semipermeable membranes into the composite backing material. The substantially purified product water generally diffuses through the folds of the semipermeable membrane comprising a thin film composite of the type hereinbefore set forth in greater detail which comprises each of the sandwiches as the aqueous solution containing the solute flows through the passageways defined in each of the sandwiches between separator grid material. The product water diffuses through the channels of the composite backing material which are formed on three sides by the epoxy-impregnated polyester and the fourth side by the thin film polyethylene terephthalate, said composite backing material being disposed intermediate the respective folds of the adjoining membrane sandwiches and thereupon flows through the channels of the backing material until it reaches the portion of the backing material which is wound around the mandrel. At this point, the product water flows into the hollow interior of the mandrel through the slots of apertures which are positioned about the outer circumferential surfaces of the mandrel. Upon leaving the hollow interior of the mandrel, the product water flows through the open end of the mandrel, through the take-off assembly and thence through the product water outlet pipe. The concentrated or dewatered aqueous solution is also recovered from the unit through an outlet pipe.

While the above discussion has illustrated the process utilizing one element or module, it is also possible that a plurality of elements or modules which are constructed in a similar manner may be employed. The similar elements or modules are suitably interconnected at their respective inlet pipes and with appropriate heat connections and their respective outlet pipes, thereby forming a dewatering or concentration apparatus which may be adapted for providing substantial quantities of the concentrated aqueous solution on a commercial scale.

The following examples are given for purposes of illustrating the present process. However, it is to be understood that these examples are merely illustrative in nature and that the present invention is not necessarily limited thereto.

EXAMPLE I

In this example, an aqueous sugar solution which was obtained by the treatment of sugar beets was subjected to a dewatering process. Six modules which were constructed in accordance with the description set forth in the specification in which the thin film semipermeable membrane comprised a polyamide prepared by cross-linking a polyethyleneimine with isophthaloyl chloride on a polysulfone support which was reinforced with a non-woven polyester backing, were linked in series. In accordance with the present invention, the backing material for the semipermeable membrane sandwich comprised a composite consisting of a thin film of a polyethylene terephthalate sandwiched between two layers of an epoxy-impregnated polyester known in the trade as tricot. Each module contains 50 square feet of membrane area. The feedstock which contains from 100 to 150 grams per liter of sugar was fed to the modules at a temperature ranging from 78° to 80° C. and pressures ranging from 420 to 740 pounds per square inch (psi), the pH of the feed being maintained in a range of from 7.0 to 8.4. The feed was charged to the units at a rate of 7.75 gal/min, while 5.5 gal/min of concentrate and 2.25 gal/min of purified water was recovered. The results of this test are set forth in Table I below:

TABLE I

| | Feed | | Concentrate | | | |
|---|---|---|---|---|---|---|
| Hours on Stream | Pressure psi | Sugar Cont. g/l | Sugar Cont. g/l | ΔP psi | Permeate Rejection % | Recovery % |
| Start | 500 | 103.8 | 185.9 | 25.0 | 99.83 | 29.0 |
| 3 | 550 | 111.4 | 174.7 | 26.0 | 99.88 | 29.0 |
| 25 | 695 | 146.3 | 211.5 | 21.5 | 99.94 | 29.0 |
| 27 | 720 | 107.1 | 199.9 | 23.0 | 99.93 | 29.0 |
| 30.5 | 650 | 137.6 | 202.2 | 21.0 | 99.91 | 29.0 |
| 35.5 | 740 | 142.1 | 206.9 | 24.0 | 99.89 | 29.0 |
| 37.5 | 420 | 126.7 | 179.2 | 24.0 | 99.91 | 29.0 |
| 54 | 630 | 126.7 | 181.5 | 25.5 | 99.91 | 29.0 |
| 73.5 | 610 | 123.4 | 189.5 | 25.0 | 99.94 | 29.0 |
| 93 | 570 | 111.4 | 175.8 | — | 99.07 | 29.0 |

It is apparent from the above table that a reverse osmosis module which was constructed so that the thin film semipermeable membrane comprised a polyamide and the backing material comprised a thin film of a polyethylene terephthalate sandwiched between two layers of an epoxy-impregnated polyester was able to concentrate or dewater a sugar solution at an elevated temperature and pressure greater than that which is commonly used in a reverse osmosis process. In addition, the module was able to operate at an efficient rate for a relatively long period of time, the permeate rejection being greater than 99% in all instances with a corresponding steady recovery rate.

EXAMPLE II

In a manner similar to that set forth in Example I above, a reverse osmosis apparatus or module may be employed to concentrate or dewater a hot brine solution in which the brine solution is charged to the module at a temperature of about 95° C. and a pressure greater than about 400 psi. Likewise, the module or plurality of modules which are connected in series may also be employed to concentrate a starch solution in which the feed is charged to the modules at a temperature up to about 95° C. and a pressure up to about 1200 psi.

I claim as my invention:

1. An apparatus for recovery by reverse osmosis of a desired product from an aqueous solution which comprises a hollow mandrel having axial passageway means provided therein, a layer of first porous backing material adjacent to and surrounding said mandrel, a plurality of generally laterally coextensive leaves of porous backing material in contact with and extending generally radially outward from said first backing material, said leaves having at least one edge thereof in a generally parallel relationship to the longitudinal axis of said mandrel, a plurality of semipermeable membrane sheets each having a fold line therein, said fold line being positioned in contact with said first porous backing material in a generally parallel relationship to the longitudinal axis of said mandrel, and each positioned between two of said leaves of porous backing material, a plurality of separator grid sheets each positioned within the folds of said membranes to form a fluid-conducting passageway within each of said folds, said pluralities of porous backing material, membranes and separator grids being spirally wound around said first backing material in overlapping relationship upon one another to form a roll comprising multiple layers of porous backing material-membrane-fluid-conducting passageways-membranes groupings, means to supply said fluid to one end of said fluid-conducting passageway, means to withdraw fluid from the opposite end of said passageway, and means to withdraw fluid from said hollow mandrel, wherein a backing material for said semipermeable membranes composite consists of a film of a polyethylene terephthalate having a thickness in the range of about 1 mil to about 10 mil and which is positioned between two layers of an epoxy-impregnated polyester, said composite forming a product-water carrying channel.

2. The apparatus as set forth in claim 1 in which said semipermeable membrane comprises a microporous support reinforced on one side thereof with a backing, the other side thereof having deposited thereon an ultra-thin film formed by cross-linking polyethyleneimine with a cross-linking agent.

3. The apparatus as set forth in claim 2 in which said cross-linking agent is isophthaloyl chloride.

4. The apparatus as set forth in claim 2 in which said microporous support is polysulfone.

5. The apparatus as set forth in claim 2 in which said backing is a non-woven polyester.

* * * * *